United States Patent [19]

Hashimoto

[11] Patent Number: 4,875,212

[45] Date of Patent: Oct. 17, 1989

[54] MEMORY DEVICE WITH INTEGRATED ERROR DETECTION AND CORRECTION

[75] Inventor: Masashi Hashimoto, Miho, Japan

[73] Assignee: Texas Instruments Incorporated, Dallas, Tex.

[21] Appl. No.: 310,496

[22] Filed: Feb. 13, 1989

Related U.S. Application Data

[63] Continuation of Ser. No. 912,027, Sep. 25, 1986, abandoned.

[30] Foreign Application Priority Data

Oct. 8, 1985 [JP] Japan .................................. 60-225739

[51] Int. Cl.⁴ ............................................. G06F 11/10
[52] U.S. Cl. .................................................. 371/40.2
[58] Field of Search ........................ 371/38, 51, 13, 21; 365/200

[56] References Cited

U.S. PATENT DOCUMENTS

| | | | |
|---|---|---|---|
| 4,319,356 | 3/1982 | Kocol | 371/38 |
| 4,335,459 | 6/1982 | Miller | 371/38 |
| 4,355,393 | 10/1982 | Kubo | 371/51 |
| 4,561,095 | 12/1985 | Khan | 371/38 |
| 4,592,024 | 5/1986 | Sakai | 365/200 |
| 4,646,304 | 2/1987 | Fossati | 371/38 |
| 4,689,792 | 8/1987 | Traynor | 371/38 |
| 4,710,934 | 12/1987 | Traynor | 371/38 |

*Primary Examiner*—Jerry Smith
*Assistant Examiner*—Robert W. Beausoliel

*Attorney, Agent, or Firm*—William E. Hiller; N. Rhys Merrett; Melvin Sharp

[57] ABSTRACT

A semiconductor memory device, comprising an information memory array storing data words each consisting of a predetermined number of information bits, a memory array storing bits generated in accordance with an error detect/correct code, the memory array having bit lines equal in number to the information bits forming each of the data words, the memory array being programmable to create error detection and correction data on the basis of which a bit in error in the main memory array is to be detected and corrected, main sense amplifiers for detecting the information bits read from the main memory array, the main sense amplifiers being equal in number to the information bits forming each of the data words, auxiliary sense amplifiers for detecting an error bit read from the main memory array and output through the main sense amplifiers, the auxiliary sense amplifiers being equal in number to the main sense amplifiers and each producing an error signal in response to an erroneous information bit read from the main memory array through any of the main sense amplifiers, and an error correction circuit intervening between the main and auxiliary sense amplifiers and transparent to an error-free information bit read from the main memory array, the error correction circuit being responsive to the error signal from any of the auxiliary sense amplifiers for inverting the logic state of an erroneous information bit read from the main memory array.

6 Claims, 3 Drawing Sheets

TO SENSE AMPS $S_0 - S_{11}$

MEMORY DEVICE WITH INTEGRATED ERROR DETECTION AND CORRECTION

This application is a continuation, of application Serial No. 912,027, filed Sept. 5, 1986 and now abandoned.

FIELD OF THE INVENTION

The present invention relates to semiconductor memory devices and particularly to a semiconductor memory device with integrated error detection and correction functions. More particularly, the present invention relates to a semiconductor memory device using a masked read-only memory as information storage means and provided with an error detect/correct circuit which is programmable during fabrication of the memory device.

BACKGROUND OF THE INVENTION

A masked read-only memory (hereinafter referred to as a mask ROM) is an information storage device into which information is written through the use of a particular photomask during fabrication of the memory device. Once information is thus written into the mask ROM, the information is retained throughout use of the memory device. Such a memory device is useful especially for fixedly storing any program typically in a microcomputer system.

Among various types of semiconductor memory devices using mask ROMs which are presently in use is a device which has incorporated therein a redundant error detect/correct circuit operative to detect bits in error in the mask ROM used as an information memory array and to correct the detected errors. Such a memory device is advantageous principally for the purpose of increasing the yield of production of memory devices. The error detect/correct circuit of this memory device includes a parity memory array comprised of parity check bits typically arranged on the basis of a Hamming error detect/correct code used as the error detection and correction algorithm.

Provision of the parity bits additionally in a memory device however gives rise to an increase in the area which the memory device occupies on a semiconductor chip. The overhead thus required for the implementation of an error detect/correct circuit increases at a rate which depends on the ratio between the number of the information bits forming a single data word and the number of the parity bits to be added to the information bits. If the information bits to be read out during each read cycle is assumed to include a single bit in error, the following relationship occurs between the number of the information bits and the number of the parity bits to be added to the information bits.

| Number of Information Bits | Number of Parity Bits |
| --- | --- |
| 8 | 5 |
| 16 | 6 |
| 24 | 6 |
| 32 | 7 |
| 40 | 7 |
| 48 | 8 |
| 56 | 8 |
| 64 | 8 |

An increase in the number of the information bits to be read out during each read cycle represents an increase in the number of the information detect means, viz., the sense amplifiers to be provided in association with the information. This in turn results in an increase in the proportion of the area occupied by the sense amplifiers in the total area of the semiconductor chip and further in an increase in the amount of power dissipation by the chip. To provide a tradeoff under such circumstances, thirty two or less bits are commonly used as the information bits to be form a single data word to read out during each read cycle. Where thirty two bits are thus used as the information bits to form a single data word, the area of the chip required for the memory device using parity bits becomes $(32+7)/32=1.22$ times the area required for the information bits. This means an overhead of about 22 per cent for the area required for the memory array for the parity bits alone. Taking into consideration the areas which are further required for the provision of the circuits for the detection and correction of errors and the sense amplifiers associated with the memory array for the parity bits, the final overhead of the chip will total up to about 25 per cent or even more. A further drawback is in that the detection and correction of errors is performed by a number of logic gates which results in an increase in the access time.

It is, accordingly, an important object of the present invention to provide an improved semiconductor memory device using a mask ROM as an information memory array and featuring an error detect/correct circuit which requires only a minimum overhead on a semiconductor chip and which permits of significant improvement in the yield of the memory device.

Another important object of the present invention is to provide an improved semiconductor memory device with integrated error detection and correction functions, the memory device having an error detect/correct circuit which is capable of detecting and correcting errors in the information bits without the penalty of increasing the access time.

SUMMARY OF THE INVENTION

In accordance with the present invention, there is provided a semiconductor memory device with integrated error detection and correction functions, comprising (a) an information memory array fixedly storing a plurality of data words each consisting of a predetermined number of information bits, (b) a memory array storing a plurality of bits generated in accordance with an detect/correct correct code, the memory array having bit lines equal in number to the information bits forming each of the data words, the memory array being programmable to create error detection and correction data on the basis of which a bit in error in the main memory array is to be detected and corrected, (c) information detecting means associated with the information memory array for detecting information bits read from the main memory array, the information detecting means comprising information detecting units equal in number to the information bits forming each of the data words, (d) error detecting means associated with the memory array for detecting an error bit read from the main memory array and output through the information detecting means, the error detecting means comprising error detecting units equal in number to the information detecting units and each operative to produce an error signal in response to an erroneous information bit read from the main memory array through the information detecting means, and e) error correction means operatively intervening between the information detecting means and the error detecting means and transparent to an error-free information bit read from the main memory array through the information detecting means, the error correction means being responsive to the error signal from any of the error detecting units for inverting the logic state of an erroneous information bit read from the main memory array through the information detecting means.

BRIEF DESCRIPTION OF THE DRAWINGS

The features and advantages of a semiconductor memory device according to the present invention will be more clearly understood from the following description taken in conjunction with the accompanying drawings in which.

DESCRIPTION OF THE PREFERRED EMBODIMENT

Figure 1:
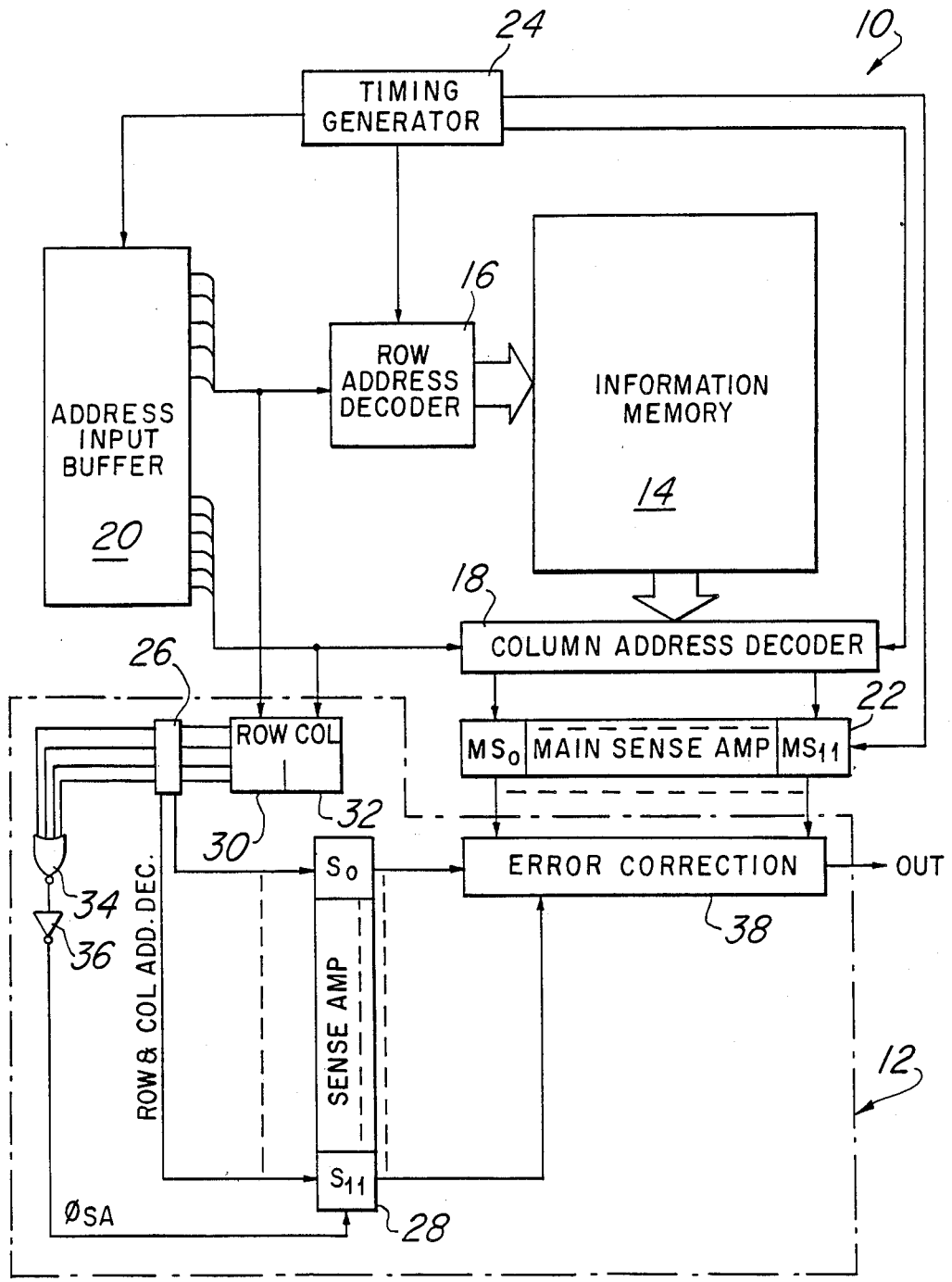
FIG. 1 is a block diagram showing a preferred embodiment of a semiconductor memory device according to the present invention.

Referring to FIG. 1, a semiconductor memory device embodying the present invention largely comprises a main memory circuit 10 and an error detect/correct circuit 12, the latter being shown enclosed within a block in phantom lines. The main memory circuit 10 is basically of a known configuration and comprises an information memory array 14 associated with row and column address decoders 16 and 18. These row and column address decoders 16 and 18 receive row and column address signals, respectively, through an address input buffer 20 to select one of the word lines and one of the bit lines in the memory array 14. The information memory array 14 is composed of a number of memory elements arranged in rows and columns and each assumed to consist of a mask ROM cell and has stored therein information in the form of data words each consisting of, for example, twelve bits. In association with the column address decoder 18 is provided a main sense amplifier circuit 22 consisting of a plurality of main sense amplifier to detect the information represented by the twelve-bit word read from the information memory array 14 at the address selected by the row and column address decoders 16 and 18. The sense amplifiers forming the main sense amplifier circuit 22 are provided in a number equal to the number of the bits forming a single data word and, thus, the main sense amplifier circuit 22 is herein assumed to consist of a total of twelve main sense amplifiers $MS_0$ to $MS_{11}$. Each of the row and column address decoders 16 and 18, address input buffer 20 and main sense amplifier 22 is operative at timings dictated by the clock signals supplied from a timing generator circuit 24.

The error detect/correct circuit 12 comprises a memory array 26 composed of memory elements also arranged in rows and columns. The memory array 26 has stored therein error detection and correction data on the basis of which the information read from the information memory array 14 is to be checked for errors and corrected if found in error. The memory array 26 has bit lines which are provided in a number equal to the number of the sense amplifiers $MS_0$ to $MS_{11}$ forming the main sense amplifier circuit 22. The bit lines thus provided, twelve in number of the memory array 26 are connected directly to an auxiliary sense amplifier circuit 28 which also consists of twelve sense amplifiers $S_0 S_{11}$. With no address decoder provided between the memory array 26 and the sense amplifier circuit 28, all the output signals from the address input buffer 20 are utilized as the signals on the basis of which a word line is to be selected in the memory array 26. In association with the memory array 26 are provided a row address decoder 30 and a column address decoder 32. The row address decoder 30 has input terminals responsive to the row address signals from the address input buffer 20 and likewise the column address decoder 32 has input terminals responsive to the column address signals from the address input buffer 20. The memory array 26 and the row and column address decoders 30 and 32 are herein assumed to be of the type composed of metal-oxide-semiconductor (MOS) field-effect transistors each initially having a laser-type fuse as will be seen from FIG. 2. Each of the memory array 26 and address decoders 30 and 32 is thus programmed by selective opening of the metal fuses with a laser-beam during fabrication of the memory device. As an alternative, each of the memory array 26 and address decoders 30 and 32 may be of the type which is programmable by electrically blowing polysilicon fuses as frequently utilized for large-capacity memory devices.

Figure 2:
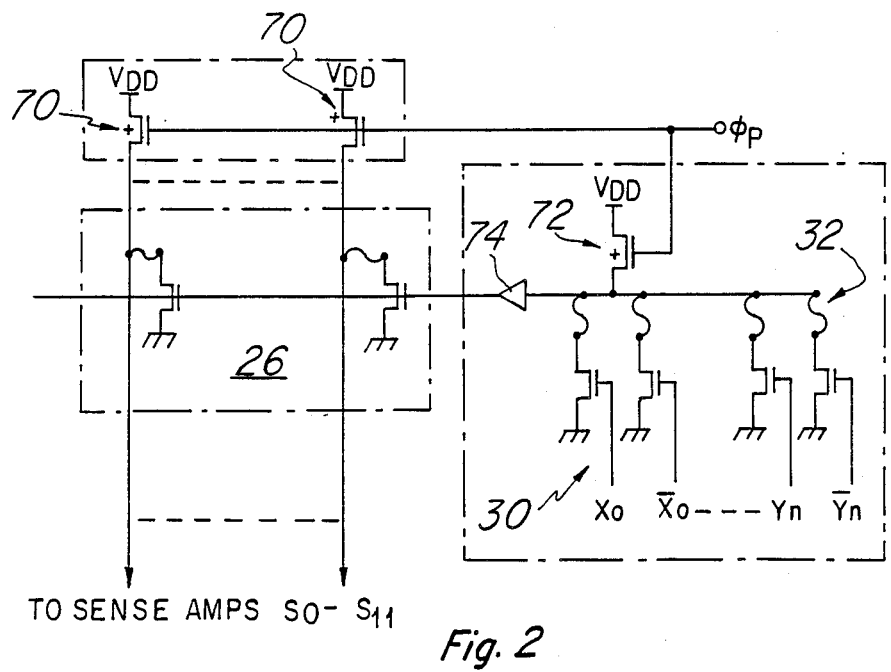
FIG. 2 is a circuit diagram schematically showing the arrangement of an error-detection memory array and associated address decoders forming part of the error detect/correct circuit in the embodiment shown in FIG. 1.

In FIG. 2, the memory array 26 is shown with two of the memory elements on one of its word lines connected to the associated bit lines by means of fuses which are to be selectively opened out by irradiation with a laser beam. In FIG. 2 (and further in FIGS. 3 and 4 to be referenced later), a MOS field-effect transistor of the p-channel type is shown with a plus sign ("+") added between the source and drain and a MOS field-effect transistor of the n-channel type is shown without addition of such a sign.

The sense amplifier circuit 28 receives an error signal from the series combination of a logic NOR gate 34 and a logic inverter 36. The NOR gate 34 has its input terminals connected to the individual word lines of the memory array 26 and is thus opened in the presence of a logic "1" state on at least one of the word lines of the memory array 26. A logic "1" signal thus appears at the output of the inverter 36 as the error signal $\phi_{SA}$ and is supplied to the sense amplifier circuit 28 when a word line containing an error bit is being accessed in the information memory array 14 as will be understood more clearly as the description proceeds. The sense amplifiers $S_0$ to $S_{11}$ of the auxiliary sense amplifier circuit 28 have respective output terminals connected to an error correction circuit 38 which is also responsive to the information read out from the main memory array 14 through the main sense amplifier circuit 22.

In the event an address having a bit in error is accessed in the information memory array 14, an address corresponding to the particular address is accessed in the memory array 26 by means of the row and column address decoders 30 and 32 of the error detect/correct circuit 12. Such techniques being well known in the art and being used ordinarily in the field of dynamic random access memories (dRAMs), no detailed description will be herein incorporated in respect thereof.

Description will be hereinafter made regarding the procedure in which the programming for the memory array 26 is to be performed. For this purpose, it is assumed by way of example that an error bit is contained in the data word read out from the information memory array 14 by means of the fourth sense amplifier $MS_3$ of the main sense amplifier circuit 22. In this instance, the fuse for the memory transistor corresponding to the particular bit in the main memory array 14 is previously opened with a laser beam on the bit line of the memory array 26 which leads to the sense amplifier $S_3$. The error bit in the main memory array 14 is thus per se not worked on by the error detect/correct circuit, this permitting a significant reduction in the period of time required for the opening of a fuse.

Figure 3:
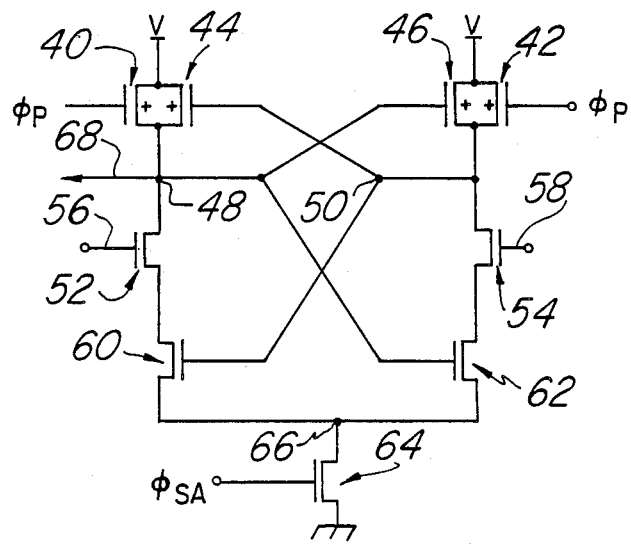
FIG. 3 is a circuit diagram showing the arrangement of a sense amplifier circuit also forming part of the error detect/ correct circuit in the embodiment shown in FIG. 1.

FIG. 3 shows the construction of a sense amplifier S which is representative of each of the sense amplifiers $S_0$ to $S_{11}$ forming the auxiliary sense amplifier circuit 28. The sense amplifier S comprises first and second precharge transistors 40 and 42 and first and second feedback transistors 44 and 46. Each of these transistors 40, 42, 44 and 46 is provided by a p-channel MOS field-effect transistor. The precharge transistors 40 and 42 have their drains connected to a voltage supply line for a supply voltage $V_{DD}$, their gates connected to a clock supply line for a precharge signal $\bar{\phi}_P$, and their sources connected to first and second sense nodes 48 and 50, respectively. Each of the precharge transistors 40 and 42 is to be activated by the precharge signal $\bar{\phi}_P$ of low level. The first and second feedback transistors 44 and 46 have their drains connected to the voltage supply line for the supply voltage $V_{DD}$, their gates respectively connected to the second and first sense nodes 50 and 48, and their sources connected to the first and second sense nodes 48 and 50, respectively.

the sense amplifier S further comprises first and second input transistors 52 and 54 each of which is implemented by an n-channel MOS field-effect transistor. The first and second input transistors 52 and 54 have their drains respectively connected to the first and second sense nodes 48 and 50 and their gates respectively connected to a data line 56 and a reference line 58. The input transistors 52 and 54 are connected in series with third and fourth feedback transistors 60 and 62 each of which is also provided by an n-channel MOS field-effect transistor. The third and fourth feedback transistors 60 and 62 have their drains respectively connected to the sources of the first and second input transistors 52 and 54, their gates respectively connected to the second and first sense nodes 50 and 48, and their sources commonly connected to ground line through a discharge transistor 64. Thus, the first sense node 48 is connected to the respective gates of the second and fourth feedback transistors 46 and 62 and the second output node 50 connected to the respective gates of the first and third feedback transistors 44 and 60. The discharge transistor 64, which is also provided by an n-channel MOS field-effect transistor, has its drain connected to the respective sources of the third and fourth feedback transistors 60 and 72 through a common node 66, its gate connected to the line leading from the previously mentioned inverter 36 (FIG. 1), and its source connected to the ground line. The discharge transistor 64 is thus activated by the error signal $\phi_{SA}$ of high level (logic "1").

The first sense node 48 of the sense amplifier S is further connected via an output line 68 to an input terminal of the error correction circuit 38 (FIG. 1). The data line 56 is connected to the gate of the first input transistor 52 which leads from one of the bit lines of the memory array 26 (Fig. 1). The bit lines of the memory array 26 are also connected to the source of the supply voltage $V_{DD}$ through respectively associated precharge transistors which are represented by p-channel MOS field-effect transistors 70 in FIG. 2. The row and column address decoders 30 and 32 (FIGS. 1 and 2) have a bus line also connected to the source of the supply voltage $V_{DD}$ across a precharge transistor 72 as shown in FIG. 2. These precharge transistors 70 and 72 are activated by the precharge signal when $\bar{\phi}_P$ when at a low level. The bus line extending through the address decoders 30 and 32 is connected through a diode 74 to each of the word lines of the memory array 26 as also shown in FIG. 2. On the other hand, the reference line 58 is connected to the gate of the second input transistor 52 which leads from a suitable source of a reference voltage, though not shown in the drawings. The clock supply line for supplying the precharge signal $\bar{\phi}_P$ to the precharge transistors 40 and 42 and precharge transistors 70 leads from the timing generator circuit 24 shown in FIG. 1.

In operation, each of the first and second precharge transistors 40 and 42 is activated to turn on in response to the precharge signal $\bar{\phi}_P$ going to a low level so that the first and second sense nodes 48 and 50 are precharged through the transistors 40 and 42, respectively, toward a level approximating the supply voltage $V_{DD}$. With such potentials established at the nodes 48 and 50, the n-channel feedback transistors 60 and 62 have their gates connected to the nodes 62 and 60, respectively, and are turned on with each of the feedback transistors 44 and 46 being maintained at a non-conduction state.

Each of the precharge transistors 70 is connected to the individual bit lines of the memory array 26 and are activated to turn on in response to the precharge signal going to a low level. The reference line 58 leading to the gate of the second input transistor 54 is connected to the reference voltage source also through a precharge transistor (not shown) which is also activated by the signal $\bar{\phi}_P$ going to a low level. Potentials approximating the supply voltage $V_{DD}$ are established at the gates of the input transistors 52 and 54 and maintain each of the n-channel transistors 52 and 54 in a conduction state when the signal $\bar{\phi}_P$ is at a low level. Under these conditions, the potentials at the first and second sense nodes 48 and 50 are passed respectively through the first and second input transistors 52 and 54 and the third and fourth feedback transistors 60 and 62 to the common node 66.

In the presence of a voltage of low level at the gate of the discharge transistor 64, the transistor 64 is maintained in a non-conduction state so that the common node 66 is disconnected from the ground line and is also precharged to a level approximating the supply voltage $V_{DD}$. A signal of a high level (logic "1") is thus established at the output line 68 leading from the sense node 48 of the sense amplifier S to the error correction circuit 38. When the precharge signal $\bar{\phi}_P$ thereafter swings to the high level, the p-channel precharge transistors 40 and 42 are turned off so that the potentials at the nodes 48, 50 and 64 float at high levels.

When an error bit is found in a data word being accessed in the main memory array 14, there appears a voltage of high level on the word line of the memory array 26 corresponding to the word line containing the error bit in the main memory array 14. The voltage of high level activates the NOR gate 34 (FIG. 1) to produce a logic "0" signal at its output terminal with the result being logic "1" signal is applied as the error signal $\phi_{SA}$ to the gate of the discharge transistor 64. On the other hand, a voltage of high level is established on the bit line of the memory array 26 corresponding to the bit line containing the error bit in the main memory array 14 and is applied through the data line 56 to the gate of the first input transistor 52. The n-channel transistors 52 and 64 are thus activated to turn on and provide a path of current from the first sense node 48 to ground by way of the input and feedback transistors 52 and 60, common node and discharge transistor 64. It therefore follows that the potential at the first sense node 48 falls to ground level so that a logic "0" signal is supplied through the output line 68 to the error correction circuit 38 shown in FIG. 1. From the foregoing description it is evident that the sense amplifier S shown in FIG. 3 is operative to produce on the output line 68 a logic "1" signal in the absence of an error bit accessed in the main memory array 14 and a logic "0" signal in response to an error bit accessed in the memory array 14.

Figure 4:
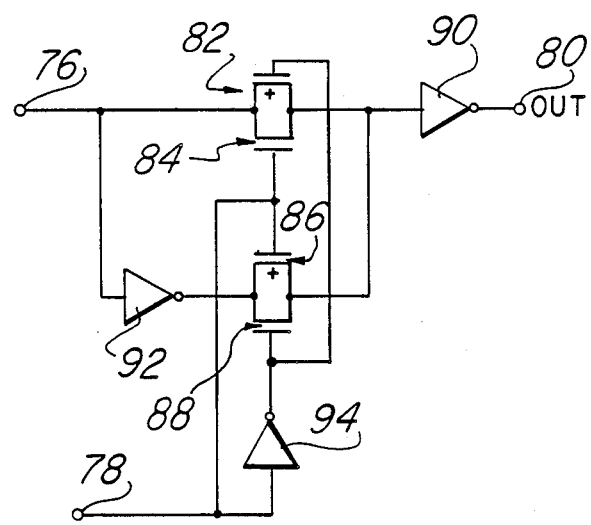
FIG. 4 is a circuit diagram showing the arrangement of an error correction circuit further forming part of the error detect/correct circuit in the embodiment shown in FIG. 1.

FIG. 4 shows the construction of the error correction circuit 38 which is responsive to such logic signals output from the sense amplifier circuit 28.

The error correction circuit 38 has first and second input terminals 76 and 78 and an output terminal 80. The first input terminal 76 leads from one of the sense amplifiers $MS_0$ to $MS_{11}$ of the main sense amplifier circuit 22 and the second input terminal 78 leads from one of the sense amplifiers $S_0$ to $S_{11}$ of the auxiliary sense amplifier circuit 28. These two input terminals 76 and 78 lead to a first transfer gate consisting of a combination of p-channel and n-channel MOS field-effect transistors 82 and 84 and a second transfer gate consisting of a combination of p-channel and n-channel MOS field-effect transistors 86 and 88. The transistors 82 and 84 forming the first transfer gate have their respective source and drain connected to the first input terminal 76 and their respective drain and source connected to the output terminal 92 through a buffer 90. The transistors 86 and 88 forming the second transfer gate have their respective source and drain connected to the first input terminal 76 through a logic inverter 92 and their respective drain and source connected through the buffer 90 to the output terminal 92. The p-channel transistor 82 of the first transfer gate and the n-channel transistor 88 of the second transfer gate have their gates commonly connected through a logic inverter 94 to the second input terminal 78. The n-channel transistor 84 of the first transfer gate and the p-channel transistor 86 of the second transfer gate have their gates commonly connected directly to the second input terminal 78.

In the presence of a logic "1" signal at the second input terminal 78, the transistors 82 and 84 forming the first transfer gate are turned on with a logic "0" signal appearing at the gate of the transistor 82 and a logic "1" signal appearing at the gate of the transistor 84. A signal appearing on the first input terminal 76 is thus passed through the first transfer gate 82/84 and the buffer 90 over to the output terminal 80 in a non-inverted form. The transistors 86 and 88 forming the second transfer gate are turned off with a logic "1" signal appearing at the gate of the transistor 86 and a logic "0" signal appearing at the gate of the transistor 88. When a bit in the main memory array 14 (FIG. 1) is found to be in error so that a logic "0" signal appears at the second input terminal 78, the transistors 86 and 88 forming the second transfer gate are turned on with a logic "0" signal appearing at the gate of the transistor 86 and a logic "1" signal appearing at the gate of the transistor 88. A signal appearing on the first input terminal 76 is thus passed through the inverter 92, second transfer gate 86/88 and buffer 90 over to the output terminal 80 in an inverted form. The transistors 82 and 84 forming the first transfer gate are turned off with a logic "1" signal appearing at the gate of the transistor 82 and a logic "0" signal appearing at the gate of the transistor 84.

A signal representative of a bit in error as applied to the first input terminal is thus output in an inverted and accordingly correct form from the error correction circuit 38 which is transparent to a signal representative of a correct bit. The transistors forming this error correction circuit 38 are turned on and off at timings proportional to the rates at which memory elements are accessed in the memory array 26. The memory array 26 being sufficiently smaller in capacity than the main memory array 14, the error detection and correction data in the memory array 26 can be read out at rates far higher than the rate at which information is to be read from the main memory array 14. The transistors forming the transfer gates in the error correction circuit 38 have therefore been completely turned on or off before a signal read from the main memory array 14 during the subsequent read cycle is supplied from the main sense amplifier circuit 22 to the error correction circuit 38. There is no substantial loss invited in the access time in the memory device embodying the present invention.

While only one preferred embodiment of a memory device according to the present invention has thus far been described and shown, it should thus be borne in mind that such an embodiment is merely by way of example and is therefore subject to various modifications and changes if desired.

What is claimed is:

1. A semiconductor memory device comprising:
    a first memory array having stored therein a plurality of data words each comprising a predetermined number of information bits;
    an integrated error detection and correction circuit including a second memory array having stored therein a plurality of bits generated in accordance with a predefined error detect/correct code, the second memory array being programmable to create error detection and correction data on the basis of which bits in error in said first memory array are to be detected and corrected,
    information detecting circuitry associated with said first memory array to detect information bits red from said first memory array, the information detecting circuitry comprising a plurality of information detecting units, said plurality being equal in number to the predetermined number of information bits,
    error detecting circuitry associated with said second memory array to detect each error bit read from said first memory array and provided by said information detecting circuitry, the error detecting circuitry comprising a plurality of error detection and correction data detecting units, the plurality of error detection and correction data detecting units being equal in number to said plurality of information detecting units and each unit being operative to produce an error signal in response to an erroneous information bit read from said first memory array through said information detecting circuitry, and an error correction circuit operatively intervening between said information detecting circuitry and said error detection and correction data detecting units to invert the logic state of each erroneous information bit read from said first memory array through said information detecting circuitry.

2. The semiconductor memory device as set forth in claim 1, in which each of said information detecting units and said detection and correction data detecting units comprises a sense amplifier.

3. The semiconductor memory device as set forth in claim 1, in which said first memory array comprises a mask ROM.

4. A semiconductor memory device comprising:

a first memory array having a plurality of blocks of data stored at predetermined locations with each location being addressable by a first address signal with at least some of said blocks containing one or more defective bits;

an error detection and correction circuit including a second memory array having error detection and correction data stored therein representative of the locations of blocks of data in which defective bits are contained, and addressable by the first address signal and a second address signal; and an error correction circuit operatively connected to receive addressed blocks of data from the first memory array as well as the error detection and correction data from the second memory array thereby to provide as an output a corrected block of data based on the received block of data and the received error detection and correction data.

5. The semiconductor memory device according to claim 4 wherein the second memory array further comprises:

error detect circuitry operatively connected to the second memory array to provide an error indication when the first and second address signals address a location of a data block having a defective bit within the first memory array.

6. The semiconductor memory device according to claim 5 further comprising:

a plurality of sense amplifiers responsive to the error indication and operatively connected between the second memory array and the error correction circuit.

* * * * *